UNITED STATES PATENT OFFICE.

FLORENTIN BIDAUD, OF LYON, FRANCE, ASSIGNOR TO SOCIETE CHIMIQUE DES USINES DU RHONE (ANCIENNEMENT GILLIARD P. MONNET ET CARTIER), OF PARIS, FRANCE.

PROCESS FOR THE MANUFACTURE OF AROMATIC OXALDEHYDES.

1,418,904. Specification of Letters Patent. Patented June 6, 1922.

No Drawing. Application filed February 26, 1921. Serial No. 448,170.

*To all whom it may concern:*

Be it known that I, FLORENTIN BIDAUD, of Lyon, France, a citizen of the Republic of France, have invented a certain new and useful Process for the Manufacture of Aromatic Oxyaldehydes, of which the following is a specification.

This invention relates to a process of manufacture of oxyaldehydes and their derivatives and has for its object a new process of general application for the manufacture of these compounds.

According to this invention, the process consists in causing a phenol or its derivative to react on compounds having for general formula:

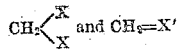

where X represents a free monovalency and X' a free divalency.

These compounds which have for common characteristic the divalent radical methylene:

can be considered as being esters or ethers of the hypothetical glycol:

This reaction takes place in presence of a nitroso compound, for instance nitrosobenzol, nitrosonaphthalene, paranitrosodimethylaniline and the like, and with the help of a catalyst.

The herein described process is susceptible of general application and allows very pure products with very good yields to be obtained in most cases.

It is particularly important as far as it concerns the manufacture of vanillin from guaiacol.

Example I. 40 parts of guaiacol, 100 parts of methylal: $CH_2(OCH_3)_2$ and the nitrosodimethylaniline derived from the reaction of nitrous acid on 80 parts of dimethylaniline are added to 500 parts of methyl alcohol. The mixture is heated on the water bath for one to two hours while gaseous hydrochloric acid is caused to continually bubble through.

After cooling the product is diluted with water and the alcohol is separated by distillation in steam. The residual aqueous solution is then shaken with benzine or ether to extract the vanillin. The vanillin is subsequently purified either by distillation in vacuum, or by crystallization from water or benzine.

Example II. One proceeds as in Example I in replacing methylal by 110 parts of methylene chloride: $CH_2Cl_2$. The operating method is identical. The results are similar.

Example III. Methylal, in Example I, is replaced by 170 parts of methylene diacetate: $CH_2(OCO-CH_3)_2$. A good yield of vanillin is obtained.

Example IV. One proceeds as in Example I with 140 parts of methylene sulphate: $CH_2SO_4$ as the methylenic compound. The result is identical with that of the above reactions.

What I claim and desire to secure by Letters Patent is:—

1. A process for the manufacture of aromatic oxyaldehydes and their derivatives, consisting in causing a phenol to react with an ether of the hypothetical glycol

in presence of a nitroso compound and hydrochloric acid.

2. A process for the manufacture of vanillin consisting in causing guaiacol to react with an ether of the hypothetical glycol

in presence of a nitroso compound and hydrochloric acid.

3. A process for the manufacture of vanillin consisting in causing guaiacol to react, with methylal in the presence of a nitroso compound and hydrochloric acid.

4. A process for the manufacture of vanillin consisting in causing guaiacol to react with methylal in the presence of nitrosodimethylaniline and of hydrochloric acid.

5. A process for the manufacture of vanillin consisting in causing guaiacol to react in methyl alcohol with methylal in the presence of nitrosodimethylaniline and of gaseous hydrochloric acid.

6. A process for the manufacture of vanillin, consisting in continuously bubbling gaseous hydrochloric acid through a mixture of 500 parts of methyl alcohol and 40 parts of guaiacol with 100 parts of methylal and the nitroso dimethylaniline produced by the reaction of nitrous acid on 80 parts dimethylaniline while heating said mixture on the water bath.

In testimony whereof I have signed my name to this specification.

FLORENTIN BIDAUD.

Witnesses:
 LUCIENNE BIRWERET,
 GRADY GORBILL.